United States Patent [19]

Stella

[11] 4,187,009

[45] Feb. 5, 1980

[54] SLIDE VALVE DISPLACING ARRANGEMENT FOR MULTIPURPOSE CASSETTE

[75] Inventor: Joseph A. Stella, Peabody, Mass.

[73] Assignee: Polaroid Corporation, Cambridge, Mass.

[21] Appl. No.: 157

[22] Filed: Jan. 2, 1979

[51] Int. Cl.² ............................................. G03C 11/00
[52] U.S. Cl. ................................ 352/130; 352/78 R; 352/92
[58] Field of Search ....................... 352/130, 78 R, 92

[56] References Cited

U.S. PATENT DOCUMENTS

| | | | |
|---|---|---|---|
| 3,778,140 | 12/1973 | Land | 352/130 |
| 3,785,725 | 1/1974 | Baiter et al. | 352/130 |
| 3,812,515 | 5/1974 | Cook | 352/130 |
| 3,872,486 | 3/1975 | Scibilia | 352/130 |
| 4,106,042 | 8/1978 | Czumak et al. | 352/130 |

*Primary Examiner*—Monroe H. Hayes
*Attorney, Agent, or Firm*—Frederick A. Goettel, Jr.

[57] ABSTRACT

A film strip carried in a multipurpose film cassette is provided with a conformation thereon which cooperates with structure carried by a processor disabling valve which may be slidably advanced, when engaged by the conformation, upon film advancement. The conformation comprises an aperture provided in the central region of the film strip which is adapted to engage a film strip engaging finger provided on the slide valve. The film strip engaging finger is disposed in a region between a pair of spaced film guiding fingers which engage only the outermost edges of the film strip. The spaced film guiding fingers and other structure in the cassette cooperate to guide the film strip in a curved S-shaped path during normal film advancement thereby. The film strip is further provided with a pair of elongated longitudinally extending slots on opposing sides of the centrally disposed slide valve engaging aperture. Under normal conditions, the film strip, as it passes in the curved path follows a path defined by the fingers and thereby does not engage the centrally disposed film engaging finger. As the portion of the film strip having the elongated slots therein passes into the region of the slide valve, the outer edges of the film strip continue to be guided in the curved path by the guide fingers; however, the inner portion of the film strip containing the slide valve engaging aperture bows outwardly following a substantially straight path thereby causing the aperture in the central portion of the film to pass between the two guide fingers wherein it positively engages the third finger thereby effecting displacement of the valve as the film strip advancement continues.

3 Claims, 6 Drawing Figures

SLIDE VALVE DISPLACING ARRANGEMENT FOR MULTIPURPOSE CASSETTE

BACKGROUND OF THE INVENTION

1. Field of the Invention

This invention relates to film processing apparatus and, more particularly, to an improved multipurpose film handling cassette for exposing, processing and projecting images of photographic film.

2. Description of the Prior Art

Multipurpose photographic cassettes have been developed for use in motion picture photographic systems capable of processing an exposed strip of photographic material to a viewable condition as illustrated and described in such prior references as U.S. Pat. No. 3,615,127 issued to Edwin H. Land on Oct. 26, 1971; U.S. Pat. No. 3,623,417 issued Nov. 30, 1971 to Vaito K. Eloranta; and U.S. Pat. No. 3,748,994 issued July 31, 1973 to Joseph A. Stella, all of which are owned by the assignee of the present invention.

In such systems, use is made of a film handling cassette within which the several operations of exposure, chemical processing, drying and projecting of the recorded images are accomplished without transferring the film from the cassette. In this arrangement, the strip of photographic film contained in the cassette may be exposed in a camera adapted to receive the cassette and then processed to provide viewable images by placing the cassette in a viewing apparatus equipped to activate the cassette-contained processor upon rewinding the exposed film strip. After processing in this manner, the viewing apparatus is operated as a projector to advance the film incrementally frame by frame past a light source for viewing of the recorded images.

In this arrangment, the unexposed photosensitive strip, initially wound upon a supply reel, preferably passes from the supply reel through a normally inoperative processing station and then across an opening of the cassette which functions at different intervals as both an exposure and projection station. Beyond the exposure station, this film is wound onto the takeup reel.

When substantially the entire length of the photosensitive strip in the cassette has been exposed and wound onto the takeup reel, the cassette is then loaded into a special purpose projector in which the motion of the film is reversed, i.e., it passes from the takeup reel back onto the supply reel. In its movement in this reverse direction, the film strip itself actuates the normally inoperable processing station so that the film strip is subjected to processing treatment in which a thin layer of processing fluid is supplied to the portion of the film emulsion intermediate the film margins by means such as, for example, a doctor blade in communication with and supplied with processing fluid passing through a nozzle which in turn communicates with a processing fluid reservoir. Immediately following processing fluid deposition, in response to further film advancement, a valve member is actuated to move into blocking engagement with the processing fluid nozzle thus terminating further passage of processing fluid from the reservoir. Following a predetermined delay period, the film strip bearing the still wet layer of processing fluid, now wound upon the supply spool again, is then again advanced through the now inoperable processing station and through the exposure/projection station for projection and completion of drying of the film.

It will be appreciated that, following the deposition of the processing fluid layer upon the film and during the above-described advancement of the still wet film back through the processing station and the projection/exposure station for the initial projection and drying operations, it is critical that the flow of processing fluid through the nozzle be completely and positively terminated. Accordingly, it is desirable to seal off the nozzle immediately following deposition of the processing fluid upon the film strip. As briefly set forth above, in prior designs, incorporated in the processor is a slidable nozzle valve which is utilized to close off the processor nozzle and thereby disable the processor immediately following treatment of the film strip with the processing fluid. In relation to the nozzle opening, the valve is positioned initially in front of or upstream of the nozzle opening in terms of film strip travel during rewind, i.e., during deposition of processing fluid. Additionally, a pressure pad component is positioned beneath the nozzle opening in a position such that a film engaging surface on the pressure pad is directly under the nozzle opening to thereby retain and interpose incremental portions of the film strip firmly against the downwardly facing surface of the fluid applicator housing.

Following the processing operation, and responsive to engagement by a film discontinuity or the like, located near the leading or takeup end of the film strip, the valve member is displaced from its initial position so that it underlies and blocks the nozzle opening. Further, during this displacement of the valve, the pressure pad is cammed downwardly away from the film strip by side cams of the valve so as to deactivate the pressure pad and to free the film strip for unrestricted travel in either direction through the processing station for subsequent projection and rewind cycles.

Accordingly, the valve member which is adapted to slide readily from its initial position to its processor disabling position serves not only to shut off the flow of processing fluid from the processor, but also serves the important function of displacing the pressure pad, which performs a critical function in spreading the desired processing fluid layer upon the film strip, during the processing operation, into a position where it will not interfere with film strip travel once the processing has been accomplished. Accordingly, it will be appreciated that it is extremely important that the engagement between the film strip and the slide valve be achieved in each and every instance so that the slide valve may be displaced to its final position wherein it serves the above-described critical functions.

One prior art approach to displacing the slide valve from its initial position to its closed position is to provide an integrally formed spring arm extension which rides against and engages the film strip during both the exposure and processing modes of operation and which is adapted to cooperate with a triangular aperture formed in the film strip at its leading end so as to displace the slide valve into its closed position at the completion of the initial rewind, i.e., processing rewind. Such an arrangement has been found to be disadvantageous in that in order to assure positive engagement of the film strip with the spring arm of the slide valve, it was found necessary that the spring arm constantly be in contact with the surface of the film strip and, accordingly, such contact resulted in undesirable scratching of the back side of the film strip. Such an arrangement is illustrated in U.S. Pat. No. 3,772,975 entitled "Photographic Film Cassette Employing Coated Processor Valve" issued to John F. Batter, Jr. et. al. on Nov. 20, 1973.

Another prior art approach for displacing the slide valve from its initial position to its closed position makes use of a pair of notches in the opposing edges of the film strip. The slide valve is provided with a pair of spaced film strip rail engaging fingers which are spaced from one another so as to engage the film strip only at the non-image bearing edge portions. The spacing of the fingers defines a region therebetween into which the necked-down portion of the film strip defined by the edge notches is configured to pass and to positively engage the slide valve for the desired displacement in response to the driving motion of the film strip. Such an arrangement is described in U.S. Pat. No. 4,106,042 entitled "Multipurpose Film Cassette Having A Processor Disabling Valve Retention Arrangement" issued to Frank M. Czumak, et al., on Apr. 26, 1977.

Both the motion picture camera and the player with which such a cassette are used are provided with a set of fixed film side guides and a set of spring loaded or moving side guides which serve to properly guide the film strip throug the area of their respective aperture blocks. It has been found that each time the above-described notches pass through the region of the side guides, the moving side guides will be depressed into the notches as they pass thereby. Over a continued period of time, such an arrangement can cause damage to the film strip in the region of the notches and eventually could cause separation of film rails which are carried at the edges of the film strip from the base film strip itself.

SUMMARY OF THE INVENTION

In accordance with the present invention, an aperture is provided in the central region of the film strip which is adapted to engage a third finger provided on the slide valve in the region between a pair of spaced film engaging fingers such as those described above in conjunction with U.S. Pat. No. 4,106,042. The aperture engaging finger is positioned in a plane spaced from the path followed by the film strip so that during exposure and processing operations, the film is contacted only at the rails by the two spaced film engaging fingers. The film strip is further provided with a pair of elongated longitudinally extending slots on opposing sides of the centrally disposed slide valve engaging aperture. Under normal conditions, the film strip, as it passes in a curved path around the two film engaging fingers, as set forth above, will follow a path defined by these fingers and thereby not engage the centrally disposed film engaging finger. As the portion of the film strip having the elongated slots passes into the region of the slide valve, the outer edges of the film strip will continue to be guided in the curved path by the guide fingers; however, the inner portion of the film strip containing the slide valve engaging aperture will tend to bow outwardly following a substantially straight path, thereby displacing the aperture in the film into a position in the space between the two guide fingers wherein it will be positively engaged by the third finger thereby effecting positive displacement of the slide valve as the film strip movement continues. Following displacement of the slide valve to its final position, the portion of the film strip containing the aperture will continue to lie flat and, as a result of the spacing of the film engaging finger of the slide valve from the film path, the strip will continue to be contacted only by the rail engaging fingers of the slide valve and the central finger will not contact and, accordingly, not scratch the image bearing surface of the film for the remaining life of the cassette.

BRIF DESCRIPTION OF THE DRAWINGS

The novel features that are considered characteristic of the invention are set forth with particularity in the appended claims. The invention itself, both as to its organization and its method of operation together with additional objects and advantages thereof, will best be understood from the following description of the preferred embodiment when read in connection with the accompanying drawings wherein like numbers have been applied in the different figures to denote the same parts and wherein:

DESCRIPTION OF THE PREFERRED EMBODIMENT

Figure 1:
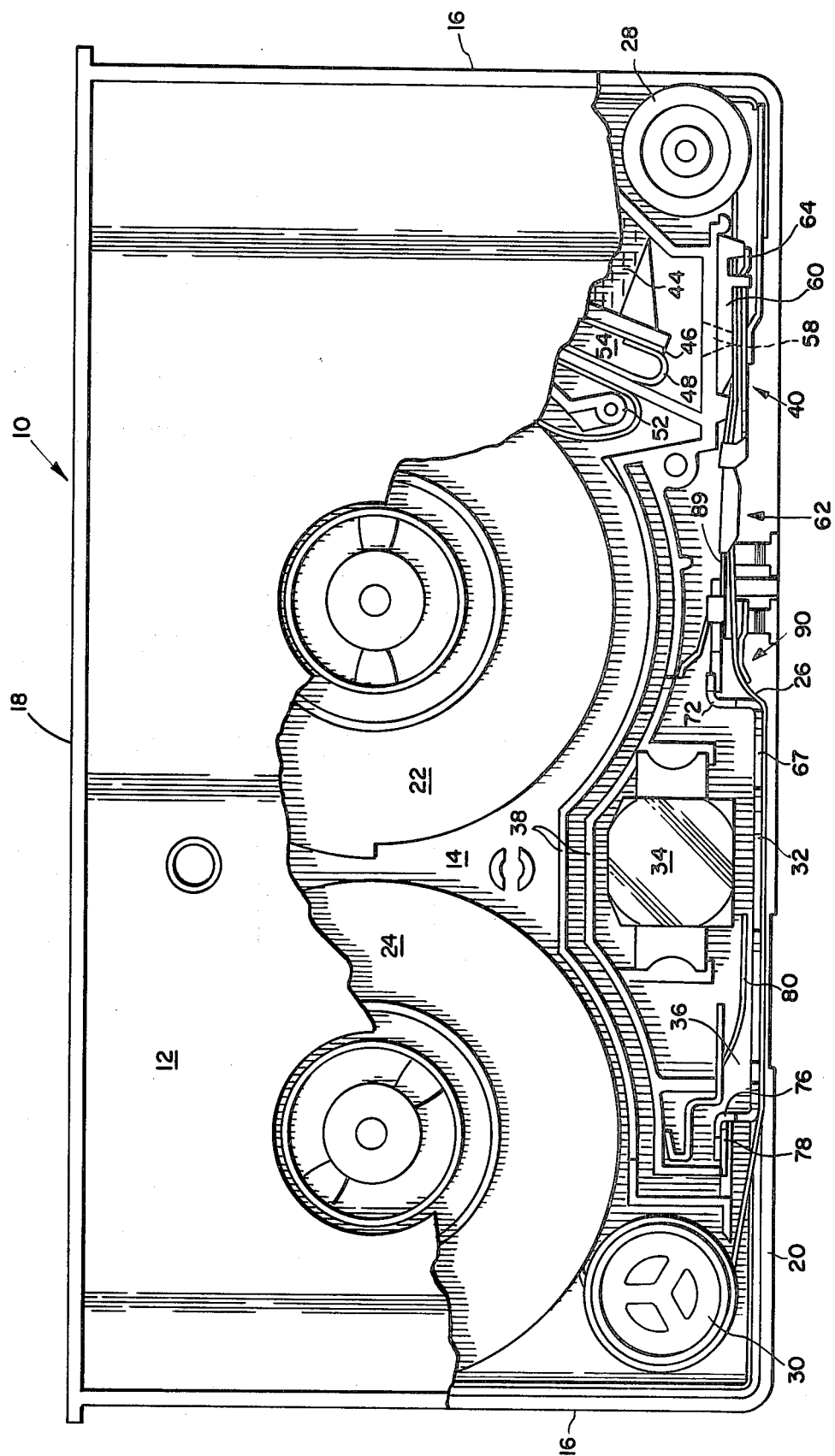
FIG. 1 is a diagrammatic view, in elevation, partially cut away to show the interior of a compact multipurpose film handling cassette embodying features of the present invention.

The multipurpose film cassette with which the present invention is particularly adapted for use is illustrated in FIG. 1 to include an outer housing 10 in the shape of a rectangular parallelepiped having front and back walls 12 and 14 respectively, end wall 16, a top wall 18 and a bottom wall 20. Mounted for rotation between the front and back walls are supply and takeup reels 22 and 24 to which supply and takeup leader ends of a film strip 26 are affixed by appropriate means. In passing from the supply reel 22 to the takeup reel 24, the film strip 26 is trained through a series of generally straight runs defined in part by an idler roller and a snubber roller, 28 and 30, respectively, and a second idler roller disposed generally in the upper right hand corner of the cassette which is not shown in the drawings. As shown, the film strip 26 is trained over an opening 32 in the bottom wall 20 which serves both for exposure of the film strip in an appropriate camera (not shown) and also for projection in a viewer or projector (also not shown) by illumination passed through a reflecting prism 34 mounted in the cassette behind the opening 32 and the portion of the film strip which passes thereover. Situated behind the prism 34 are air vent openings (not shown) in the back wall 14 to permit the circulation of air over the prism 34 for cooling and also for drying after film strip processing in the manner to be described below. A pressure plate 36 is mounted in the cassette housing behind the cassette opening to support the segment of the film strip passing thereby. The air vents, the pressure plate 36 and the prism 34 are isolated from the supply and takeup spools 22 and 24 by a labyrinth-type light seal formed in part by internal ribs 38.

Also contained in the cassette housing 10 is a processor generally designated by the reference numeral 40 which is operative after exposure of the film strip 26 to deposit a layer of processing fluid onto the emulsion bearing side of the film strip over the entire length thereof. The processor includes a reservoir 44 in which the processing fluid is initially sealed by a tear tab closure 46 secured over a planar opening in the reservoir. In the cassette shown in FIG. 1, the fluid chamber 44 is defined by a separate part adapted to be received in the processor, the part being loaded with the processing fluid and having affixed thereto the tear tab closure 46.

To enable release of the processing fluid from the initially sealed chamber 44 after exposure of the film strip 26, a pull strip 48 having one end releasably secured to the tear tab closure 46 is trained about a pair of guide rollers, only one of which, 52, is shown in the drawings so that a free end (not shown) of the pull strip may be engaged by an aperture (not shown) in the supply end of the film strip 26 upon initial rewind movement thereof. The operation of the pull strip 48 is described fully in U.S. Pat. No. 3,895,862 of Joseph A Stella, et al., which is assigned to the assignee of the present invention. Briefly, the free end portion of the pull strip 48 rides against the outermost convolution of the film strip contained on the supply spool 22 as the film strip is paid from the supply spool to the takeup spool 24 during exposure of the film strip. Reversal of the film strip direction of movement during rewind, however, effects an attachment of the pull strip to the supply end leader of the film strip so that the pull strip will be wound with the film onto the supply spool 22. As a consequence, the tear tab closrue 46 will be drawn away from the reservoir opening to release the processing fluid to a second chamber 54 in the processor.

The chamber 54 is located over an opening 58 in a processing fluid applicator nozzle 50 and the released processing fluid passes into the chamber and through the nozzle opening for application to the emulsion bearing side of the film strip 26. Incorporated in the processor 40 is a nozzle valve 62 which, as later explained in detail with respect to the operation of the cassette, is utilized to close off the processor nozzle 60 and thereby disable the processor following the treatment of the film strip 26 with the processing fluid. In relation to the nozzle opening 58, the valve 62 is positioned initially to the left as shown in FIG. 1 or upstream of the opening in terms of the direction of film strip travel during rewind. Additionally, a pressure pad 64 supported by a leaf spring 66 retains the film strip 26 in operative relation to the nozzle 60 during film strip processing.

It is to be noted that the multipurpose cassette and components thereof described in the proceeding paragraphs represent a cassette structure which in itself is not novel with the present invention. It is important to a full understanding of the present invention, however, that the characteristics and operation of the cassette illustrated in FIG. 1 be understood. Specifically, following exposure of the film strip by incremental advance thereof past the opening 32 in a direction proceeding from the supply spool 22 to the takeup spool 24, a processing operation is initiated by driving the supply spool 22 at a constant angular velocity to rewind the film strip from the takeup spool 24 back onto the supply spool 22. This procedure is effected by removing the cassette from the camera in which it is exposed and placing it in a processor/viewer device (not shown) equiped with appropriate means for driving the supply spool 22 to rewind the film stirp 26 in the manner described. During such rewinding movement, the emulsion side of the film strip will be drawn past the nozzle 60 to receive a layer of processing fluid now released from the reservoir 44 as a result of the tear tab closure 46 having been removed in the manner described above.

Immediately following the processing operation, and, as a result of engagement between an aperture in the film strip and an aperture engaging extension of the slide valve as will be described in detail hereinbelow, the valve 62 is caused to move to the right from the position illustrated in FIG. 1 to its final position illustrated in FIG. 6 wherein it underlies and blocks the nozzle opening 58. Further, during this displacement of the valve 62, the pressure pad 64 is cammed downwardly away from the film strip 26 by side cams 68 of the valve so as to de-activate the pressure pad and to free the film strip 26 for unrestricted travel through the nozzle/pressure pad region during subsequent projection and rewind cycles.

Figure 2:
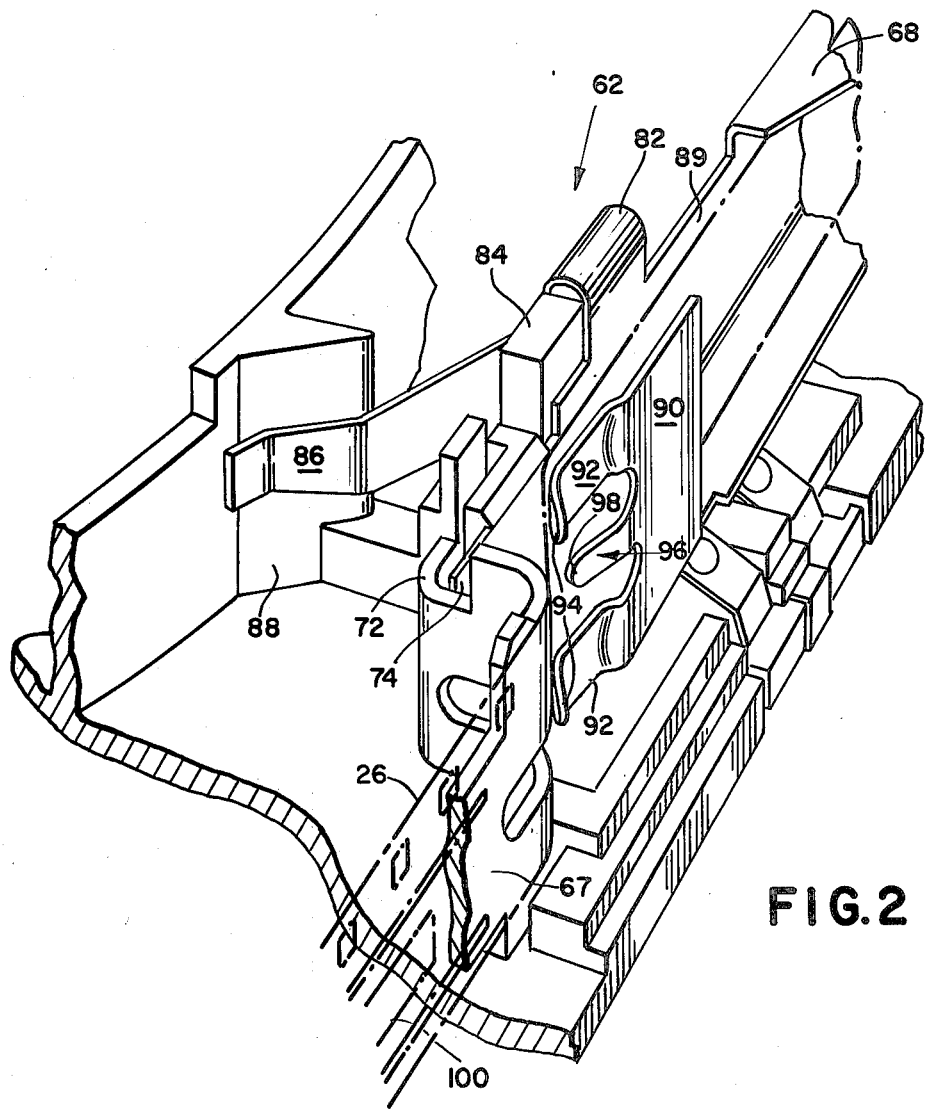
FIG. 2 is a perspective view of a portion of a cassette illustrating the position of the slide valve prior to movement responsive to film advancement.

As previously indicated, a pressure plate 36 is mounted in the cassette housing 10 behind the cassette opening 32 to support the segment of the film strip 26 passing thereby. Referring to FIGS. 1 and 2, the pressure plate 36 comprises a central plate member 67 having a substantially centrally located aperture (not shown) immediately adjacent the prism 34. The plate member 67 terminates at each end in a pressure plate mounting section offset from and parallel to the plane of the central plate member 67. The pressure plate mounting section 72 on the right hand end of the pressure plate, i.e., the end adjacent the nozzle valve 62, is adapted to bear against a mating portion of the cassette internal structure 74 to retain the pressure plate in the position shown in FIG. 1. The pressure plate retaining section 76 at the opposite end of the pressure plate is similarly retained in the position shown in FIG. 1 by a corresponding mating structural section 78 in the interior of the cassette. The pressure plate is held positively in the position shown in FIG. 1 by a leaf spring structure 80 which biases the pressure plate outwardly through a force applied to the pressure plate just to the left of the opening in the pressure plate central member 67.

Again with reference to FIGS. 1 and 2, it will be seen that the displacable nozzle valve 62 comprises an inverted U-shaped sheet metal section 82 which is adapted to slidably engage a structural interior portion 84 of the cassette which extends upwardly from the bottom wall 20. Extending from the back side of the U-shaped section 82 of the nozzle valve is a resilient nozzle valve retaining member 86 which is configured to engage a ramped wall 88 also comprising an interior structural portion extending upwardly from the bottom wall 20 of the cassette. Spring force and friction is developed between the nozzle valve retaining member 86 and the ramped wall 88 which tends to retain the slide valve 62 in its initial position until the valve is engaged by the film strip and moved to its final position wherein it will seal off the processing fluid nozzle upon termination of the processing mode of operation of the cassette.

Again with reference to FIGS. 1 and 2, it will be seen that the displaceable nozzle valve 62 comprises an elongated centrally disposed body 89 which forms the forward part of the U-shaped section 82. This central body 89, along with a film strip guiding section 90 which extends upwardly from the bottom of the central body, serves to define the path of the film strip as it passes by the slide valve as will now be described in greater detail. The outwardly disposed film guiding section 90 is provided with a pair of spaced parallel film guiding fingers 92 extending from the upper and lower extremities thereof in a direction opposite to the direction of film movement during the processing operation, i.e., toward the pressure plate 36. As is best seen in FIG. 1, each of the two guide fingers 92 are provided with rounded leading ends 94 to avoid damage to the film strip 26 as it is passed thereby as will now be described. The path of the film strip 26 through the exposure/projection region 32 and, as it passes by the displaceable slide valve 62, is defined by the plane of the outwardly facing surface of the pressure plate 36 of central member 67 and the rearwardly facing surfaces of the rounded ends 94 of the above-described film guide fingers 92. Accordingly, the film strip passes in a substantially straight run across the central plate member 76 of the pressure plate 36 and at the end thereof, i.e., the right hand end as viewed in FIG. 1, the film undergoes a rearward shift forming an essentially S-shaped curve by passing behind the ends 94 of guide fingers 92 to lie in a second plane substantially parallel to and spaced from the plane of the pressure plate central member 67. The second plane lies in a region defined between the outwardly facing surface of the central body 89 of the nozzle valve 62 and the rearwardly facing surfaces of the spaced film guide fingers 92.

As best seen in FIG. 2, the upwardly extending film strip guiding section 90 of the slide valve 62, which carries the film guiding fingers 92, is provided with a third appendage or finger 96 extending from the region between the fingers 92 in the same direction as and substantially parallel to the fingers 92. As is seen in FIG. 1, this third finger is attached to the plate such that its free end 98 terminates in a plane which lies between the plane defined by the pressure plate central member 67 and the second plane described above. Accordingly, during normal passage of the film strip 26 through the above-described S-shaped path, the third finger 96 does not contact the back side of the moving film strip. As will be appreciated hereinbelow, it is this appendage however, that is engaged by the specially configured portion of the film strip when the displacement of the slide valve 62 to its sealing position is caused to occur.

Figures 3, 4:
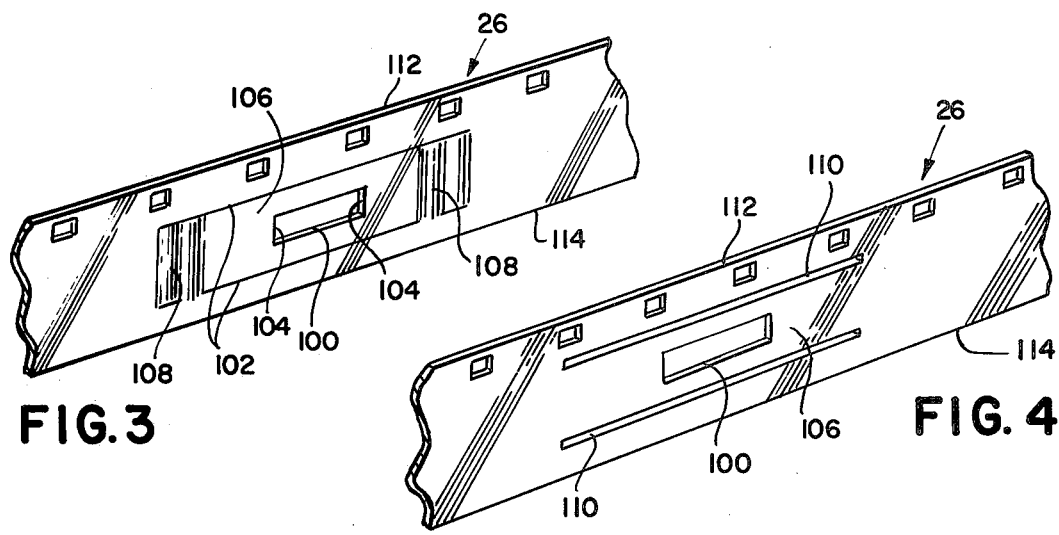
FIG. 3 is a view illustrating that portion of the film strip configured to engage and advance the slide valve to its second position in accordance with a first embodiment of the invention.
FIG. 4 is a view similar to FIG. 3 illustrating another embodiment of the invention.

Referring now to FIGS. 3 and 4, two embodiments of the region of the film strip which is adapted to engage and displace the slide valve 62 are illustrated. Each of these embodiments comprises an elongated centrally disposed slide valve engaging aperture 100 extending lengthwise along the film strip. This aperture 100 is sized to be at least as wide as the width of the centrally located finger 69 provided on the slide valve. In the embodiment of the film strip in FIG. 3, the film is provided with a pair of elongated slits 102 adjacent the lateral edges thereof and extending a substantial distance in each direction beyond the longitudinal ends 104 of the centrally disposed aperture 100. These slits 102 are positioned upon the film strip so that the central portion 106 of the film strip defined therebetween, i.e., the portion in which the slide valve engaging aperture 100 is located, will be free to pass between the pair of parallel spaced apart guide fingers 92 of the slide valve 62. For reasons which will be apparent following the description of the embodiment of FIG. 3, the film strip 26 is crimped or deformed along the line 108 extending between the lateral ends of the longitudinally extending slits 102 in the film strip in a manner such that the portion 106 of the film strip defined between the slits tends to be urged somewhat outwardly, i.e., in a direction towards the film engaging appendage 92 of the slide valve, again for reasons which will be apparent as the description progresses.

The embodiment of the film strip illustrated in FIG. 4 contains a pair of elongated slots 110 in place of the slits provided in the film strip of FIG. 3. These slots formed by actually punching out or cutting away an elongated strip of the film will permit unrestrained movement of the aperture containing portion 106 of the film strip relative to the rest of the film strip, by eliminating the possibility of friction between the adjacent edges of the slits which may occur with the embodiment of FIG. 3.

Each of the illustrated embodiments of the film strip configuration reacts substantially the same in the actual operation of the cassette and, accordingly, no distinction will be made between the two in describing the interaction between the film strip 26 and the slide valve 62 in driving the valve to its sealing position. Accordingly, following operation of the cassette as described above to deposit processing fluid on the emulsion side of the film strip 26, the slide valve engaging aperture 100 of the film strip which is located near the end of the takeup end of the film strip, will operatively engage the central appendage 92 of the slide valve 62 and overcome the retaining force of the retaining member 86 and carry the valve with it to position the valve in its final position in sealing relationship with the nozzle valve 58 as shown in FIG. 6.

Figure 5:
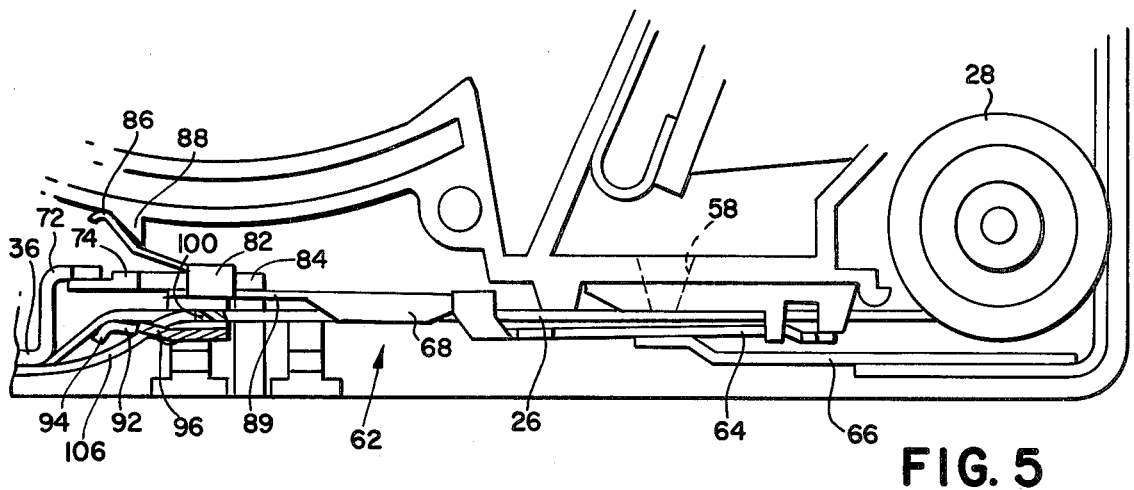
FIG. 5 is a simplified elevation view illustraging the film strip of FIG. 3 as it is about to engage the slide valve.

Engagement of the film strip 26 with the slide valve 62 is achieved automatically as the film strip conformation containing the aperture 100 passes into the region of the spaced parallel fingers 92 which serve, prior to termination of the processing step, to guide the film strip, in the S-shaped path, through the region occupied by the slide valve 62. As best seen in FIG. 5, as the leading end of the portion of the film strip 26 containing the slits 102 or slots 110 passes into engagement with the spaced guide fingers 92, the edge portions, i.e., the upper 112 and lower 114 portions of the film strip, respectively, will continue to be guided in the S-shaped path described hereinabove. The central portion 106 of the film strip, however, does not follow the S-shaped path, and will tend to follow a more direct, i.e., straight, path from the plane defined by the pressure plate central member 67 to the second plane defined between the spaced guide fingers 92 and the outwardly facing surface of the central body 89 of the valve 62. As this occurs, as best seen in FIG. 2, the central aperture containing portion 106 of the film strip 26 will pass freely into the region between the spaced parallel fingers 92 and the elongated slide valve engaging aperture 100 will readily slide onto and positively engage the central finger 96 of the slide valve as the film strip continues advancing thereby and, upon such positive engagement, further advancement of the film strip 26 will result in displacement of the slide valve 62 from its initial position to the position illustrated in FIG. 6 where it serves to seal the processing fluid nozzle 58.

Figure 6:
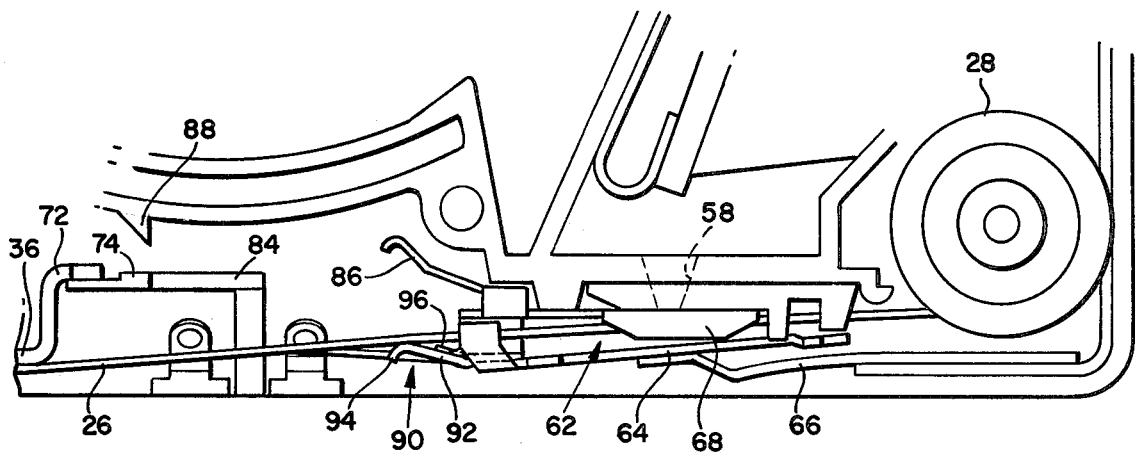
FIG. 6 is a view similar to FIG. 5 showing the slide valve in its final displaced position.

With further reference to FIG. 6, it will be seen that the path of the film strip 26 past the slide valve 62 when in its final position, that is, in its position between the processing nozzle 60 and the pressure pad 64, is such that the centrally disposed film strip engaging finger lies out of contact with the film strip and, accordingly, will remain in such relationship for the useful life of the cassette, thus eliminating the possibility of scratching the back side of the film strip during normal projection operation of the cassette.

Accordingly, there has been provided an arrangement for positively and reliably displacing a processor disabling valve in a multipurpose film cassette which advantageously does not require alteration of the edge portions of the film strip and also does not require positive engagement of the central image bearing portion of the film strip by any part of the valve displacing arrangement during any mode of operation of the cassette including exposure, processing and subsequent projection cycles.

This invention may be practiced or embodied in still other ways without parting from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. A motion picture film handling cassette for use with other apparatus for first exposing a strip of photographic film material and then treating the film strip with processing fluid to develop viewable images on the film strip, said cassette comprising:

a strip of photographic material;

a housing for retaining said film strip, said housing including an opening for exposing progressive incremental sections of said film strip;

means responsive to drive means of said other apparatus for advancing said film strip in a given path within said housing, said given path traversing said opening;

a pressure plate located within said housing at said opening, said pressure plate being configured to engage and support a length of one side of said film strip so as to support progressive incremental sections of said film strip passing thereby in a given focal plane;

film processing means for depositing a layer of processing fluid on said one side of said film strip following exposure thereof, including a nozzle opening configured for releasing said fluid;

selectively operable means for disabling said film processing means following deposit of said fluid layer, said means for disabling comprising a valve member configured for movement responsive to film strip advancement in a given direction between a first position along said film path at a location between said pressure plate and said nozzle opening and a second position wherein said valve is in blocking engagement with said nozzle opening, said valve including a pair of parallel spaced apart film strip guiding fingers located immediately adjacent the end of said pressure plate nearest said slide valve and configured to engage respectively the margins of the opposite side of said film strip from that engaged by said pressure plate, said spaced fingers being positioned with respect to said pressure plate so as to guide said film strip from said given focal plane defined by said pressure plate to a second plane substantially parallel to and spaced from said focal plane to thereby guide said film strip passing from said pressure plate, in said given direction, into engagement with said fingers through a substantially S-shaped path, said slide valve further including a third finger located between said spaced film guiding fingers and extending from said slide valve toward said pressure plate and lying in a plane intermediate said focal plane and said second plane defined by said guide fingers; and said film strip being provided with an elongated aperture therein intermediate said film margins, said elongated aperture being at least as wide as said third finger carried by said slide valve, said film strip further including a pair of elongated through slits therein extending on opposite lateral sides of and beyond the longitudinal extremities of said centrally disposed aperture, said slits being spaced from one another a distance less than the spacing between said pair of parallel spaced film engaging fingers carried by said slide valve, said centrally disposed aperture and the accompanying film strip slits being positioned along the length of said film strip at a location such that said aperture will approach said S-shaped path substantially simultaneous with completion of deposition of processing fluid upon the usable length of film strip, said elongated slits resulting in the portion of said film strip lying between said slits, which portion includes said elongated aperture, following a substantially straight path from said focal plane to said second plane defined by said pair of spaced film guiding fingers of said slide valve thereby resulting in the engagement of said third finger with said film strip aperture as said film strip is advanced thereby and, further, wherein continued advancement of said film strip in said given direction will result in positive displacement of said slide valve to its said second position.

2. The apparatus of claim 1 wherein the portion of film strip extending laterally between the ends of each of said slits is deformed in the direction away from said focal plane.

3. The apparatus of claim 1 wherein said elongated slits are replaced by narrow elongated slots.

* * * * *